United States Patent
McLane et al.

(10) Patent No.: US 8,391,495 B2
(45) Date of Patent: Mar. 5, 2013

(54) SECURE SHELL USED TO OPEN A USER'S ENCRYPTED FILE SYSTEM KEYSTORE

(75) Inventors: Tommy Lucas McLane, Hutto, TX (US); Shawn Patrick Mullen, Buda, TX (US); Jyoti Basavaraj Tenginakai, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 12/117,448

(22) Filed: May 8, 2008

(65) Prior Publication Data
US 2009/0279703 A1 Nov. 12, 2009

(51) Int. Cl.
*H04L 9/00* (2006.01)
*H04L 9/08* (2006.01)
*H04L 29/06* (2006.01)
*G06F 17/30* (2006.01)

(52) U.S. Cl. ............ 380/279; 380/277; 380/282; 726/4; 726/5; 726/17; 726/21; 713/170; 713/171

(58) Field of Classification Search .................. 380/277, 380/279, 282; 713/170, 171; 726/4, 517, 726/21, 5, 17
See application file for complete search history.

(56) References Cited

U.S. PATENT DOCUMENTS

| | | | |
|---|---|---|---|
| 5,604,801 A * | 2/1997 | Dolan et al. ................. | 713/159 |
| 6,795,917 B1 | 9/2004 | Ylonen | |
| 7,299,364 B2 | 11/2007 | Noble et al. | |
| 7,336,790 B1 | 2/2008 | Caronni et al. | |
| 7,805,608 B2 * | 9/2010 | Chow ............................. | 713/168 |
| 2003/0005178 A1 * | 1/2003 | Hemsath ........................ | 709/328 |
| 2004/0146015 A1 * | 7/2004 | Cross et al. ................... | 370/328 |
| 2005/0091491 A1 * | 4/2005 | Lee et al. ....................... | 713/167 |
| 2005/0144474 A1 | 6/2005 | Takala et al. | |
| 2007/0033643 A1 | 2/2007 | Rossi et al. | |
| 2007/0083665 A1 | 4/2007 | Miao | |
| 2007/0266443 A1 * | 11/2007 | Wilson et al. ................... | 726/27 |
| 2009/0178123 A1 * | 7/2009 | Carpenter et al. ................ | 726/5 |

* cited by examiner

*Primary Examiner* — Peter Shaw
(74) *Attorney, Agent, or Firm* — David Mims; Robert C. Rolnik

(57) ABSTRACT

The present invention provides a computer implemented method, apparatus, and data processing system for associating a private part of a keystore of a user with a user authentication process in an encrypting file system. A secure shell daemon server establishes the user authentication process with a secure shell client such that the user authentication process is associated with a user and the user is authenticated. The secure shell daemon server obtains an acknowledgment from the secure shell client. The secure shell daemon server accesses a user public key of the user from the keystore of the user, responsive to receiving the acknowledgment. The secure shell daemon obtains a public secure shell cookie associated with the user from the keystore of the user. The public secure shell cookie is an access key in encrypted form. The access key is based on the user's public key to form the public secure shell cookie. The secure shell daemon server obtains the access key from the secure shell client. The private part of the keystore is associated with the user authentication process, wherein the private part is accessed based on the access key.

12 Claims, 3 Drawing Sheets

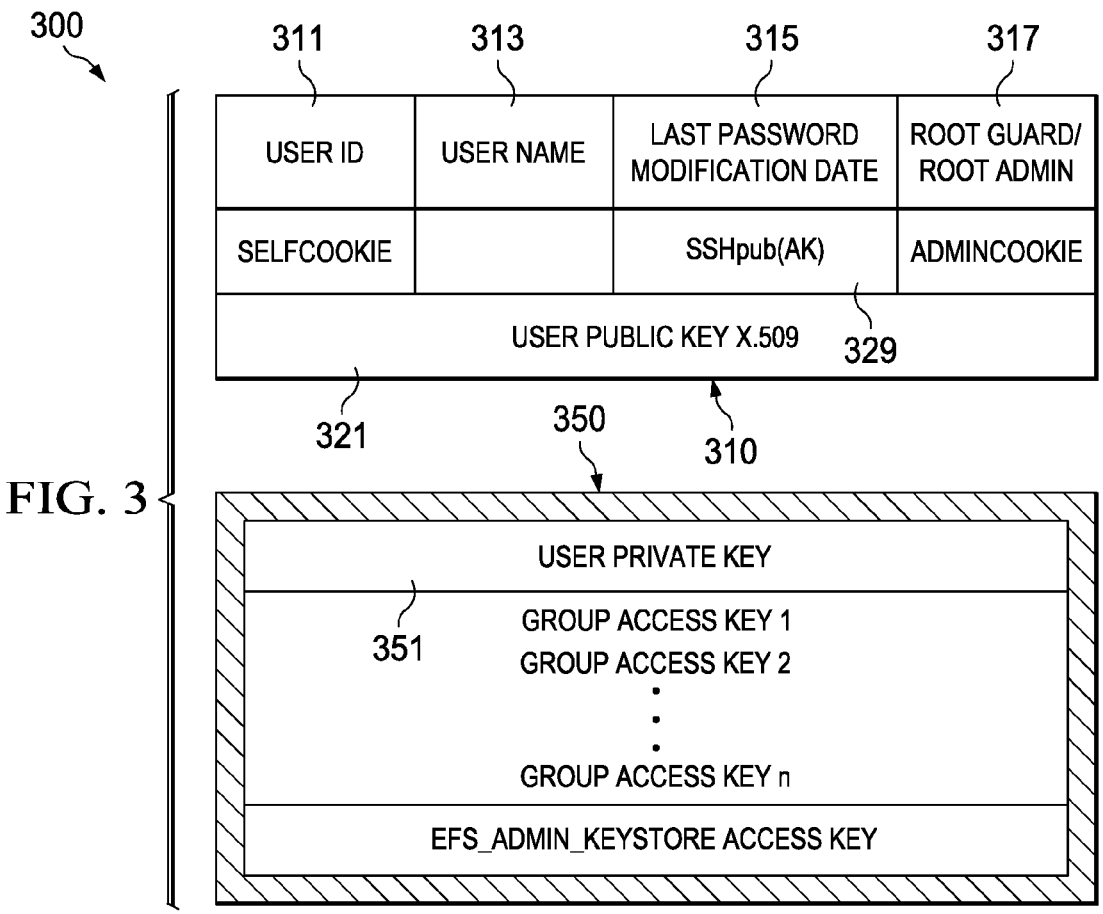
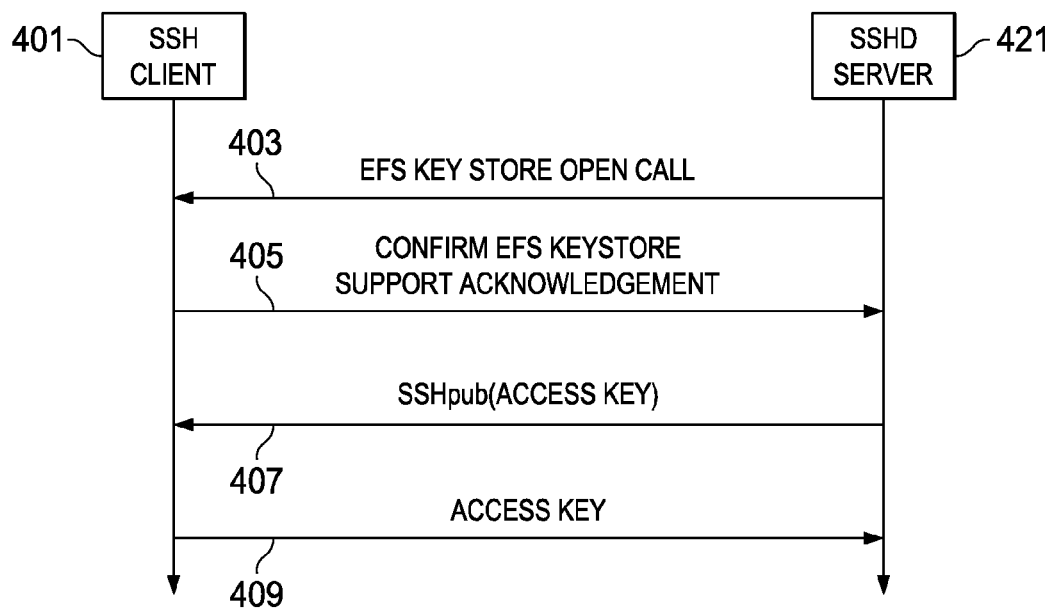

SECURE SHELL USED TO OPEN A USER'S ENCRYPTED FILE SYSTEM KEYSTORE

BACKGROUND OF THE INVENTION

1. Field of the Invention

The present invention relates generally to a computer implemented method, data processing system, and computer program product for remotely authenticating a user. More specifically, the present invention relates to enhancing secure shell or other remote authentication access to users over insecure network infrastructure.

2. Description of the Related Art

Modern uses of networked computers involve a user operating a data processing system that attaches to a network of other data processing systems. Often, the network can include the Internet. As such, the network may have several nodes that are between a data processing system that the user most directly uses, and a node that the user wants to access.

A user who logs into a node remote from his location may use a remote shell protocol to login to the remote node. However, without additional protocols, information sent to that remote node may be visible to unknown parties that control intermediate nodes through which the user's data packets travel. Consequently, such a user lacks any assurance of privacy with respect to such nodes.

Accordingly, developers created a secure shell protocol to enable some protections for data that crossed networks in this manner. A secure shell protocol is a security protocol that is typically used for the transfer control protocol (TCP) and the internet protocol. The secure shell may be used above any protocol that provides reliable data streams. A reliable data stream is a stream that normally is controlled by a protocol to deliver data packets to a receiver in the same order that the data packets appeared when the packets were sent from the source data processing node. The secure shell protocol assures that packets sent via this channel are encrypted. In addition, the secure shell protocol provides authentication of the sender and receiver of packets.

In order to establish the encrypted channel, a secure shell client initiates an authentication handshake with a secure shell server. A secure shell client is the data processing system that begins the exchange with the server, and generally supports a user entering login identifiers, passwords, and text entry to a command line prompt. The handshake can include, for example, the secure shell client or SSH client transmitting login credential encrypted with a user public key. Accordingly, upon properly authenticating, the secure shell client may provide a man-machine interface from the user to the secure shell server or host. Moreover, the exchanges between this client and the server are protected by encryption placed on the packets communicated to each device.

Multiuser data processing systems likewise, face challenges in that data owned by one user is intended for the private use of that user alone, or for that user and designated colleagues. Accordingly, in such systems, a need arose to compartmentalize access to files to individuals or to groups, based on each user proving his or her identity to the system. One such system stores files using an encrypting file system. An encrypting file system or EFS is a file system that encrypts files using keys stored in a cryptographically protected key store or keystore. Consequently, such files are stored to disk or other media in an encrypted form. The data processing system responds to users that provide inputs through a process of the system called a login process. The login process or shell is the user session by which the user interacts with the data processing system. Keyboard, mouse, and other inputs are entered during a period or session. The session occurs between an authenticated login and the login process termination. Such inputs during this time are treated as inputs from the specific user associated with the login and password given at the beginning of the session.

Although data processing systems have provided ways for a user to authenticate by locally logging into a system and thus accessing the user's keystore, such data processing systems have not provided an equally secure way to authenticate SSH (secure shell) clients, such that access keys for EFS are provided to the client. Moreover, for SSH clients that are enabled for accessing a keystore for EFS, SSH servers are unable to properly allow or disallow such SSH clients from accessing even rudimentary SSH services when the SSH client produces credentials for accessing EFS keystores.

SUMMARY OF THE INVENTION

The present invention provides a computer implemented method, apparatus, and data processing system for associating a private part of a keystore of a user with a user authentication process in an encrypting file system. A secure shell daemon server establishes the user authentication process with a secure shell client such that the user authentication process is associated with a user and the user is authenticated. The secure shell daemon server obtains an acknowledgment from the secure shell client. The secure shell daemon server accesses a user public key of the user from the keystore of the user, responsive to receiving the acknowledgment. The secure shell daemon obtains a public secure shell cookie associated with the user from the keystore of the user. The public secure shell cookie is an access key in encrypted form. The access key is based on the user's public key to form the public secure shell cookie. The secure shell daemon server obtains the access key from the secure shell client. The private part of the keystore is associated with the user authentication process, wherein the private part is accessed based on the access key.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a data structure of an EFS keystore in accordance with an illustrative embodiment of the invention;

FIG. 4 is a communication diagram of messages sent between an SSH client and an SSHD server in accordance with an illustrative embodiment of the invention.

DETAILED DESCRIPTION OF THE PREFERRED EMBODIMENT

Figure 1:
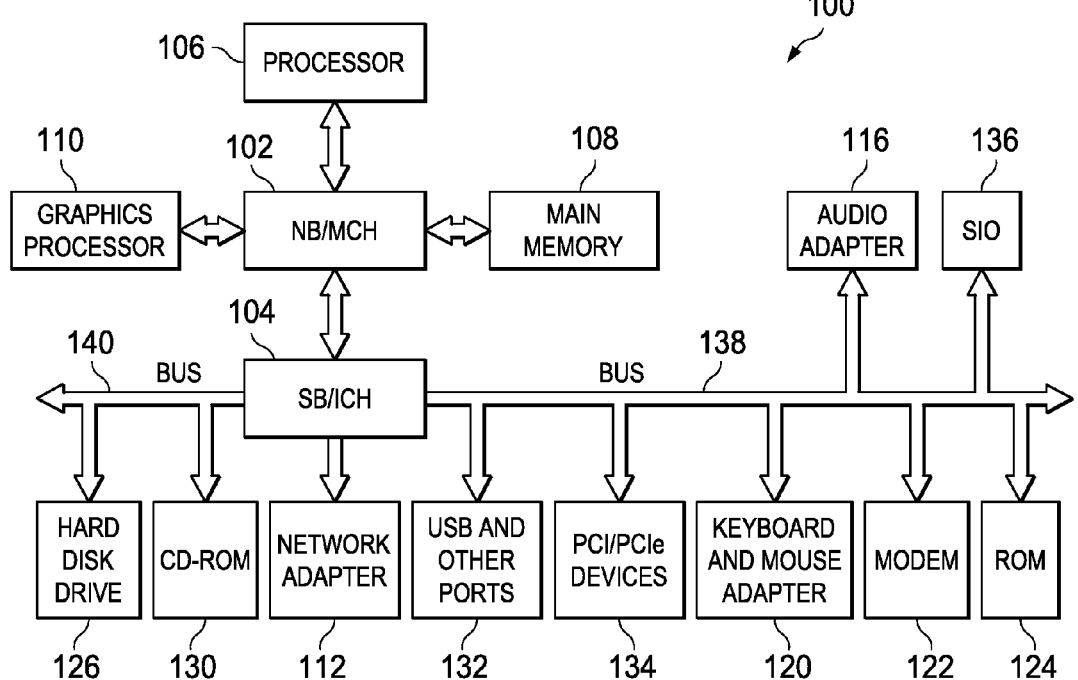
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for enabling an SSH client to access a keystore private part kept by a data processing system having an EFS keystore. Moreover, in situations where the SSH server is not configured to handle EFS, the SSH server can accordingly report to the SSH client that EFS is not supported. A keystore includes private and public parts. Each part can include one or more keys. Private keys are associated to users and/or groups. These keys are stored in keystores, protected by a data processing system that requires a correct password for access.

Figure 2:
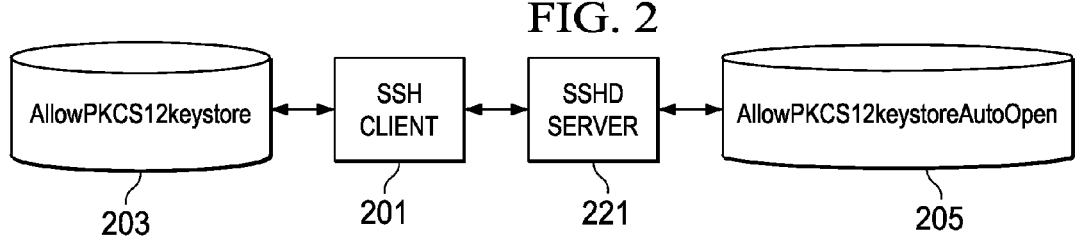
FIG. 2 is a network diagram of an SSH client and an SSHD server in accordance with an illustrative embodiment of the invention.

FIG. 2 is a network diagram of an SSH client and a SSH server in accordance with an illustrative embodiment of the invention. Secure shell (SSH) client 201 connects to secure shell daemon (SSHD) server 221 via a link. The link may be a direct connection, LAN network, Internet, or other networking connection between data processing nodes. SSH client 201 maintains a client configuration file 203 within which the SSH client keeps an EFS support bit set or unset. The client configuration file 203 may use a variable or field name of AllowPKCS12keystore as a convenient moniker for the EFS support option. The option may be a bit, or a data field in a data structure comprised of bits. Accordingly, such an option field may be set between two states, namely, enabled and disabled. When the state is enabled, the EFS support option may be described as set. Client configuration file 203 may have other configurable options for SSH client 201.

By the same token, SSHD server 221 may also support server configuration file 205 within which the SSHD client keeps an EFS support bit set or unset. The server configuration file 205 may use a variable or field name of AllowPKCS12keystoreAutoOpen as a convenient moniker for the EFS support bit set. Thus, when both an SSH client and an SSHD server have their respective EFS support bits set, an advanced feature set may be available to a user operating a secure shell between these devices.

FIG. 3 is a data structure of an EFS keystore in accordance with an illustrative embodiment of the invention. The EFS keystore may be formed according to public key cryptography standards (PKCS). The private keys may be encrypted by a user's password. Accordingly, the EFS keystore is comprised of a public part that provides storage for the public key, as well as a private part that encrypts the one or more private keys. Thus, the data stored with the private part may be an encrypted version of the private key. For example, keystore 300 includes public part 310 and private part 350. The EFS keystore public part 310 includes a user identifier, for example user ID 311. Additional information may also be provided in the public part 310, for example, user name 313, last password modification date 315, as well as root guard/root admin 317.

EFS keystore public part 310 may include a user public key, for example, user public key 321 established according to the X.509 standard. Various cookies may also be stored within public part 310, including selfcookie and admincookie. In particular, the illustrative embodiment of the invention includes a public secure shell cookie.

A public secure shell cookie is a cookie that is an access key encrypted using the user's public key associated with the SSH client. In the case of keystore 300, the public secure shell cookie is SSHpub(AK) 329. Within the nomenclature of SSHpub(AK), the term AK is an access key Thus, SSHpub(AK) may be the result of encrypting the user's access key with a user public key. The user public key and the user private key may be created using, for example, asymmetric-key cryptosystem algorithm, among others. Such asymmetric-key cryptosystems algorithms include, for example, the RSA algorithm.

The private part of keystore 300 includes at least user private key 351. Unless otherwise stated, all components of private part 350 are present in an encrypted form within keystore 300. Accordingly, the literal data of user private key 351 and other components are not present in the private part— but rather, the encrypted forms of the literal data exist within private part 350. The private key may be according to PKCS#8 as described in the public key cryptography standards. Thus, the private part of a keystore includes data that is useful, if and only if decrypted by using a matching public key. Accordingly, FIG. 3 describes component parts of private part 350 according to each component's use and function when correctly decrypted. Such component parts can include one or more group access keys, such as used in EFS, as well as an EFS administrator keystore access key, shown, for example, as EFS_admin_keystore access key 359. A group access key is an access key to the group keystore.

FIG. 4 is a communication diagram of messages sent between an SSH client and an SSHD server in accordance with an illustrative embodiment of the invention. SSH client 401 communicates with SSHD server 421 to establish a SSH session. Initially, the SSH client may establish a secure shell session with SSHD server 421. If AllowPKCS12keystore=yes in a configuration file of the SSHD server, the SSHD server may transmit an EFS keystore open call 403. Such an open call can include sending a data packet with warning message, "Warning: Could not open user's PKCS12 format keystore, Version 2.0". The warning message may vary in its particulars, for example, the version number may be other than 2.0, as provided according to the PKCS12 implemented in a particular embodiment of the invention. Next, the SSH client sends a confirmation of EFS keystore support in an acknowledgement if the AllowPKCS12keystoreAutoOpen=yes 405. If this option on the client side is unset, the client will display the above warning message to the shell session of the user. The SSHD server may respond by sending the user's access key encrypted with the user's public key. Such a message can be SSHpub(Access key) 407. The SSH client then decrypts this SSHpub cookie using his private key and responds with access key 409, which corresponds to the user.

Figure 5:
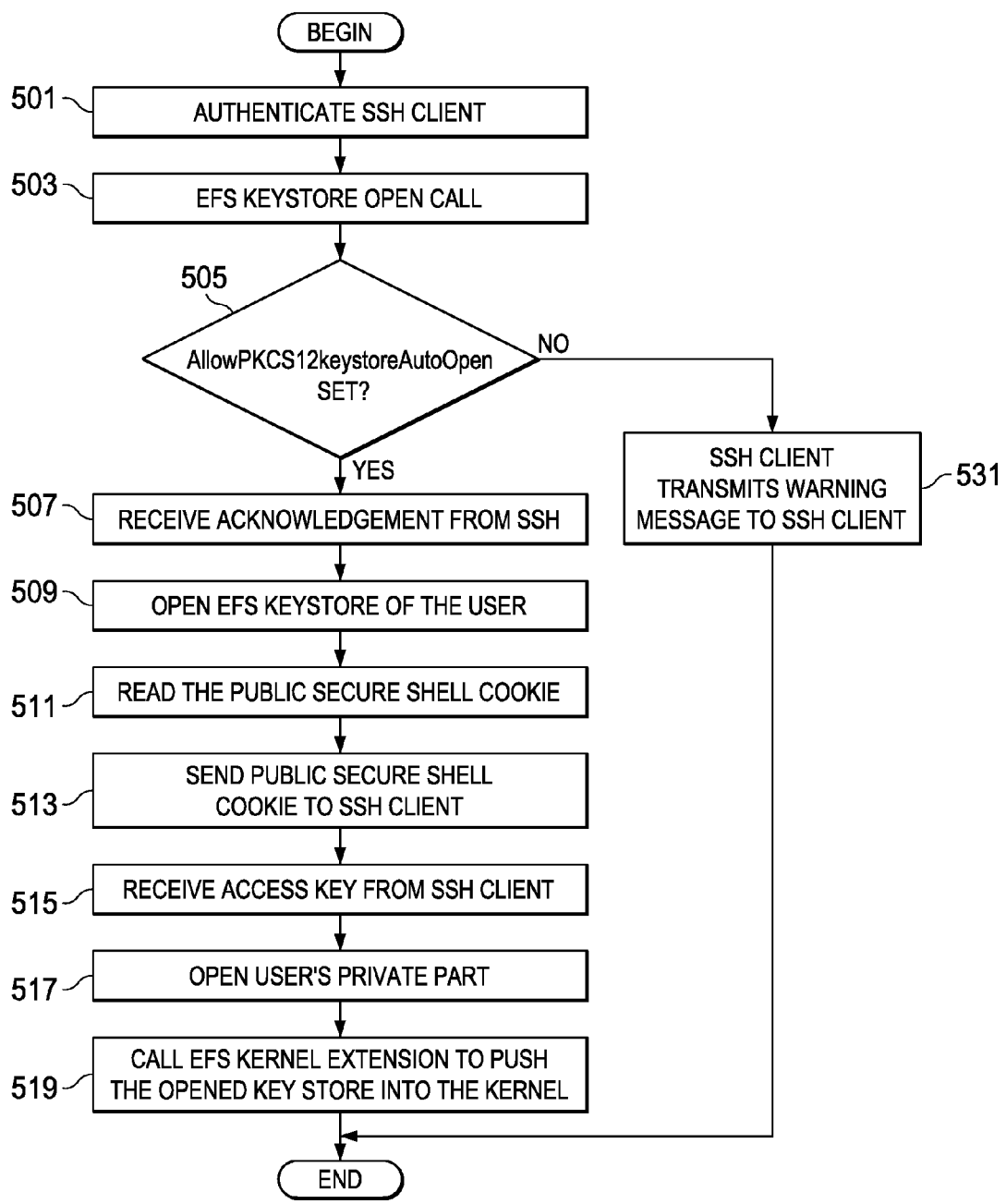
FIG. 5 is a flowchart of steps performed by an SSHD server in accordance with an illustrative embodiment of the invention.

FIG. 5 is a flowchart of steps performed by an SSHD server in accordance with an illustrative embodiment of the invention. Initially, an SSHD server authenticates an SSH client (step 501). The SSHD server may authenticate the SSH client using a user authentication process. The SSH client and SSHD server can be, for example, SSH client 401 and SSHD server 421, respectively, of FIG. 4. As with any authenticated SSH session, the SSH client is associated with a user who controls the credentials offered via the authentication step.

A user authentication process is a process that remains active during a period that a user maintains a session active with a host. A session may include data transfers, for example, file transport protocol transfers. The user authentication process may provide a user interface for accessing operating system functions. The user authentication process may have an associated process identifier to permit differentiated treatment of a particular instance of the user authentication process among other concurrent authentication processes. The user authentication process can be a user login process, in that the user authentication process may respond or otherwise interface to queries such as 'finger' commonly used in UNIX and UNIX-like operating systems. Moreover, the authentication process may also perform the features of a login process.

Next, the SSHD server makes an EFS keystore open call thereby sending a packet containing a warning message (step 503). Next, the SSHD server determines if the server configuration file has an EFS support option enabled (step 505). In this illustrative embodiment, the EFS support option may be named AllowPKCS12keystoreAutoOpen. Further, in this example, an EFS support bit may be considered to be enabled if a user readable string is assigned to a variable or data structure that uses the name AllowPKCS12keystoreAutoOpen, such as, for example, "yes". The server configuration file may be server configuration file 205 of FIG. 2. Responsive to a negative determination at step 505, the SSHD server may transmit a warning message to the SSH client (step 531). Processing terminates thereafter.

An SSHD server may not have the EFS support bit enabled if the SSHD server is not enabled to support EFS. Nevertheless, the SSH client and the SSHD server may continue an SSH session following step 531.

Following a positive determination at step 505, the SSHD server may receive an acknowledgment from the SSH client (step 507). The acknowledgment may indicate that the SSH client supports EFS file systems. The SSH client may transmit such an acknowledgment if an EFS support bit is enabled in the SSH client configuration file. Next, the SSHD server may open the EFS keystore of the user (step 509). The applicable user is the user associated with the session opened at step 501. Next, the SSHD server reads the public secure shell cookie (step 511). The public secure shell cookie may be SSHpub (AK) 329 of FIG. 3.

Next, the SSHD server may send the public secure shell cookie to the SSH client (step 513). As explained above, the public secure shell cookie comprises an encrypted form of the user's access key. Accordingly, the user can use a private key to decrypt the public secure shell cookie and obtain the access key. Next, the SSHD server receives the access key from the SSH client (step 515).

Next, the SSHD server opens the user's private part of the keystore (step 517). The SSHD may perform step 517 by using the access key provided in step 515. Accordingly, the SSHD server calls the EFS routines. Such routines may load the keys to a temporary place and finally bind these keys to the user authentication process credentials. Once the keys are bound to the user authentication process, credentials are bound the keys can be used by crypto operations such as encryption or decryption (step 519). Accordingly, step 519 enables instructions only of the user authentication process and processes controlled by the user authentication process to access the access keys based on the encrypted form of the access keys obtained from the user's private part. Processing terminates thereafter.

As a result of the above operations performed at the SSHD server and elsewhere, an SSH client may seamlessly authenticate a user for an SSH session to a SSHD server, as well as automatically associate user credentials necessary for EFS file access with the user's login process, among other processes. Consequently, a properly authenticated user does not need to further authenticate herself to reach files that she is entitled to access. When an SSH client does not support this option, an SSH client may receive a message from the SSHD server that may inform the SSH client to not perform additional steps to obtain access keys.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for associating a private part of a keystore of a user with a user login process in an encrypting file system and wherein a group access key is used to access files within the encrypting file system, the method comprising:

establishing a user authentication process with a secure shell client, wherein the user authentication process is associated with the user and the user is authenticated;

obtaining an acknowledgment from the secure shell client;

responsive to receiving the acknowledgment, accessing a user public key of the user from the keystore of the user;

a secure shell daemon server obtaining a public secure shell cookie associated with the user from the keystore of the user, wherein the public secure shell cookie encrypts an access key of the user, whereby the secure shell daemon server sends the public secure shell cookie to the secure shell client; and the secure shell daemon server receives the access key from the secure shell client in response to sending the public secure shell cookie;

the secure shell daemon server obtaining the access key from the secure shell client; and associating the private part of the keystore with the user authentication process, wherein the private part is accessed based on the access key.

2. The computer implemented method of claim 1, wherein accessing the user public key of the user is responsive to a determination that the secure shell daemon server has an encrypting file system (EFS) option set.

3. The computer implemented method of claim 2, wherein obtaining the acknowledgment further comprises:

transmitting a keystore open call to the secure shell client; and receiving the acknowledgment from the secure shell client, wherein the acknowledgment indicates that the secure shell client supports the encrypting file system (EFS).

4. The computer implemented method of claim 1, wherein obtaining the acknowledgment further comprises:

transmitting the keystore open call to the secure shell client; and receiving the acknowledgment from the secure shell client, wherein the acknowledgment indicates that the secure shell client supports the encrypting file system (EFS).

5. A computer program product for associating a private part of a keystore of a user with a user authentication process in an encrypting file system and wherein a group access key is used to access files within the encrypting file system, the computer program product comprising:

a computer usable tangible storage device having computer usable program code embodied therewith, the computer program product comprising:

computer usable program code configured to establish a user authentication process with a secure shell client, wherein the user authentication process is associated with the user and the user is authenticated;

computer usable program code configured to obtain an acknowledgment from the secure shell client; computer usable program code configured to access a user public key of the user from the keystore of the user responsive to receiving the acknowledgment;

computer usable program code configured for a secure shell daemon server to obtain a public secure shell cookie associated with the user from the keystore of the user, wherein the public secure shell cookie encrypts an access key of the user, whereby the secure shell daemon server sends the public secure shell cookie to the secure shell client; and the secure shell daemon server receives the access key from the secure shell client in response to sending the public secure shell cookie; computer usable program code configured for the secure shell daemon server to obtain the access key from the secure shell client; and computer usable program code configured to associate the private part of the keystore with the user authentication process, wherein the private part is accessed based on the access key.

6. The computer program product of claim 5, wherein computer usable program code configured to access the user public key of the user is responsive to a determination that the secure shell daemon server has an encrypting file system (EFS) option set.

7. The computer program product of claim 6, wherein computer usable program code configured to obtain the acknowledgment further comprises:
- computer usable program code configured to transmit a keystore open call to the secure shell client; and
- computer usable program code configured to receive the acknowledgment from the secure shell client, wherein the acknowledgment indicates that the secure shell client supports the encrypting file system (EFS).

8. The computer program product of claim 5, wherein obtaining the acknowledgment further comprises:
- computer usable program code configured to transmit the keystore open call to the secure shell client; and
- computer usable program code configured to receive the acknowledgment from the secure shell client, wherein the acknowledgment indicates that the secure shell client supports the encrypting file system (EFS).

9. A data processing system comprising:
- a bus;
- a storage device connected to the bus, wherein computer usable code is located in the storage device;
- a communication unit connected to the bus;
- a processing unit connected to the bus, wherein the processing unit executes the computer usable code for associating a private part of a keystore of a user with a user authentication process in an encrypting file system and wherein a group access key is used to access files within the encrypting file system, wherein the processing unit executes the computer usable program code to establish a user authentication process with a secure shell client, wherein the user authentication process is associated with the user and the user is authenticated; obtain an acknowledgment from the secure shell client; access a user public key of the user from the keystore of the user responsive to receiving the acknowledgment; obtain a public secure shell cookie associated with the user from the keystore of the user, wherein the public secure shell cookie encrypts an access key of the user, whereby the secure shell daemon server sends the public secure shell cookie to the secure shell client; and the secure shell daemon server receives the access key from the secure shell client in response to sending the public secure shell cookie; and obtain the access key from the secure shell client; and associate the private part of the keystore with the user authentication process, wherein the private part is accessed based on the access key.

10. The data processing system of claim 9, wherein in executing computer usable code to access the user public key of the user, the processing unit executes computer usable code to access the user public key of the user responsive to a determination that the secure shell daemon server has the encrypting file system (EFS) option set.

11. The data processing system of claim 10, wherein in executing computer usable code to obtain the acknowledgment, the processing unit executes computer usable code to transmit a keystore open call to the secure shell client; and receive the acknowledgment from the secure shell client, wherein the acknowledgement indicates that the secure shell client supports the encrypting file system (EFS).

12. The data processing system of claim 9, wherein in executing computer usable code to obtain the acknowledgment, the processing unit executes computer usable code to transmit the keystore open call to the secure shell client; and receive the acknowledgment from the secure shell client, wherein the acknowledgment indicates that the secure shell client supports the encrypting file system (EFS).

* * * * *